Figure 4:
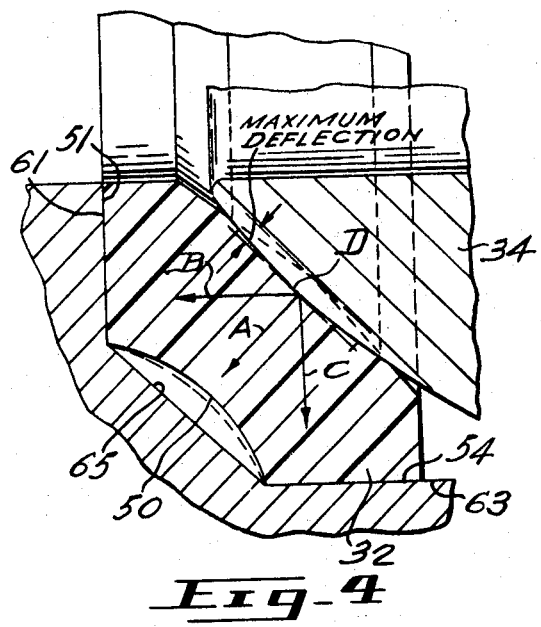

May 21, 1968  R. L. RIPERT  3,384,341
BALL VALVE SEAT
Filed July 27, 1964  2 Sheets-Sheet 1
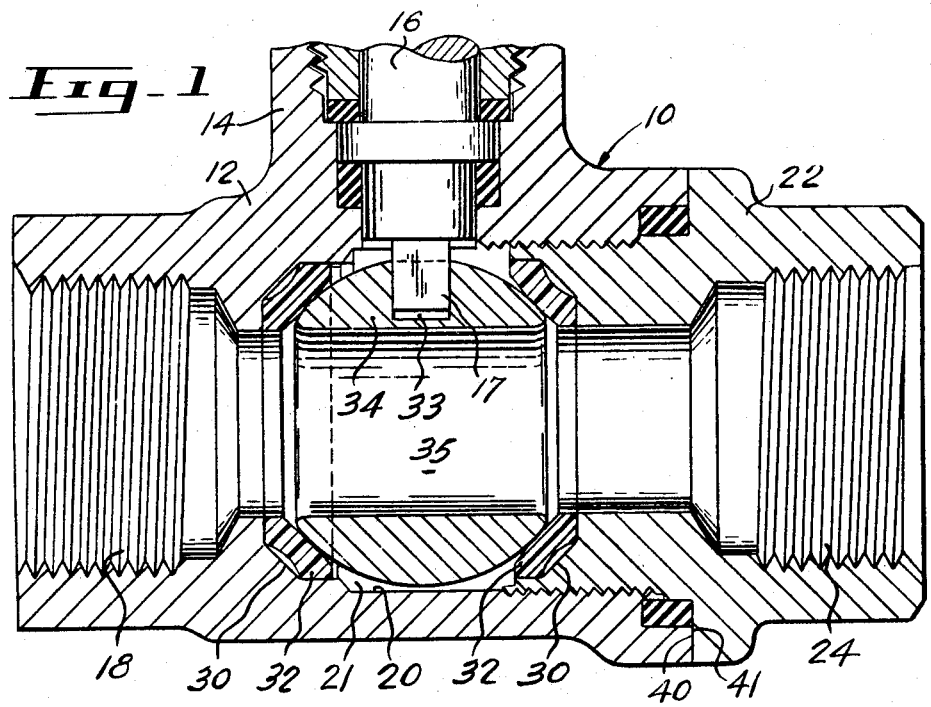
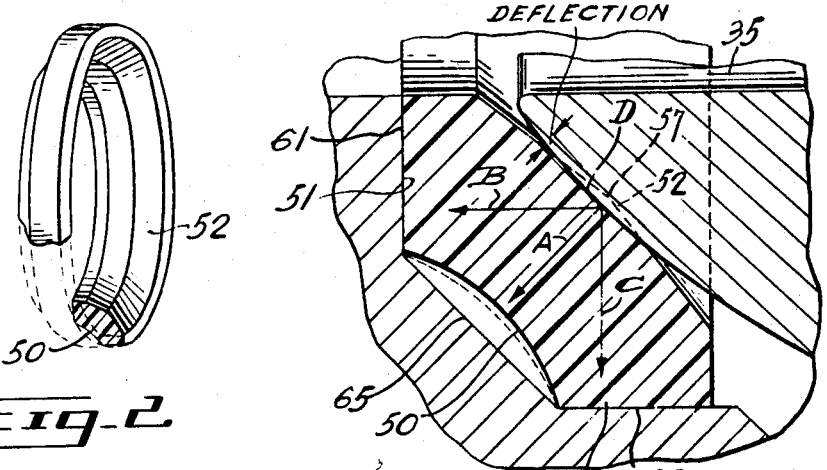
INVENTOR
Roger Louis RIPERT
ATTORNEY INVENTOR
Roger Louis RIPERT

ATTORNEY

3,384,341
BALL VALVE SEAT
Roger Louis Ripert, Roxboro, Quebec, Canada, assignor to Velan Engineering Ltd., Montreal, Quebec, Canada
Filed July 27, 1964, Ser. No. 385,119
4 Claims. (Cl. 251—315)

The present arrangement relates to improvements in the construction of ball valves and more particularly to an improved annular seat seal utilized between the valve body seats and the usual spherical ball valve.

As is well known, a main requirement in the manufacture of ball valves is that an effective seal be maintained between the valve seats and the ball at all times. Many and varied forms of annular seals have been devised for this purpose, together with many types of supplementary rings and pressure plates to ensure sealing contact between sealing rings, valve seats and the ball under all operating conditions.

Almost all of the prior art sealing rings of this type rely on some means of applying compression to the rings once they are in place so that they are in fact squeezed into the desired sealing contact. This constant application of compression forces together with the additional compression forces applied by the fluid being controlled means that even if relative flexible materials are utilized for the rings, for example nylon or other similar plastic materials, they still tend to become deformed after a relatively short service life, so that even if the desired seal is effected, the valve at times is difficult to operate and moreover, when it is necessary to remove the sealing rings for renewal, it is difficult to remove such rings which have, under compression (cold flow), become deformed and lost their ability to return to their original shape. A further problem which is well known in the manufacture of valves in general and particularly with respect to ball valves is that in order that the sealing rings fit properly, whether they are deformable or not, great care must be taken in the machining and assembly of the valve body components so as to maintain the necessary close tolerances between opposing valve seats.

The present invention recognizes these and other problems inherent in the manufacture and assembly of sealing rings for ball valves and aims to provide a solution in the form of a novel sealing ring design which is adapted to furnish proper sealing contact between valve seats and ball under all operating conditions, and which accomplishes this by operating under tension rather than compression to avoid the deforming characteristics common in prior art sealing rings.

More specifically, a main feature of the invention resides in the cross-sectional shape of the sealing rings which is formed to have a somewhat arcuate over-all formation with a substantially concave outer surface and a substantially convex inner surface which means that when pressure is applied to the inner surface, by contact with the ball, it tends to flex inwardly and due to the concavity of the outer surface, the middle portion of the ring increases in circumference under tension, somewhat in the manner of a stretched rubber band.

In a preferred form the ring is made as having a flat outer peripheral surface about the exterior, and at substantially 90° to this first flat outer surface, a further flat outer surface surrounding the interior opening of the ring with the portions of the valve body forming the ring receiving grooves surrounding the valve seats being machined accordingly. With this arrangement, when the rings are in place and the ball inserted, the contact of the ball against the convex inner surface of each of the opposed rings acts to extend the circumference of the rings so that each makes a positive contact with the opposed 90° surfaces of the ring accommodating grooves surrounding the valve seats, and since the rings are under tension, as mentioned above, the portions of the inner surface in contact with the spherical outer surface of the ball are in sealing contact at all times. As will be appreciated, the degree of contact pressure of the ball will proportionally effect the area of the sealing ring in sealing contact. As will be obvious from the foregoing, the present sealing ring and seat construction permits much greater tolerances between opposing valve seats and, therefore, facilitates manufacture of ball valves considerably.

Figure 5:
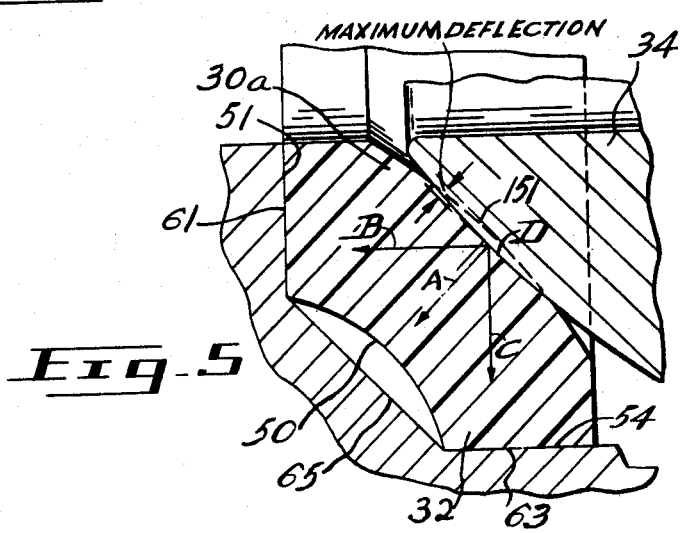

Having thus generally described the nature of the invention, particular reference will be made to the accompanying drawings showing preferred embodiments thereof, and in which;

FIGURE 1 shows in vertical cross-section a ball valve construction embodying a preferred form of sealing rings according to the invention, FIGURE 2 shows in perspective elevation and partially broken to show the cross-section, a preferred form of a sealing ring according to the invention, FIGURE 3 is a greatly enlarged, somewhat diagrammatic, view partially in cross-section of a portion of the valve body ring accommodating recess surrounding a valve seat, a cross-section of a sealing ring as shown in FIGURE 2, and a portion of a ball to illustrate the action of the seal in sealing contact under minimum deflection as would occur with preferred tolerance conditions between opposed valve seats, FIGURE 4 is a greatly enlarged view corresponding to FIGURE 3 to illustrate the action under maximum deflection conditions where the spacing between valve seats was less than shown in FIGURE 3, and FIGURE 5 is a greatly enlarged view corresponding to FIGURES 3 and 4 showing an alternative form of sealing ring according to the invention having a smooth arcuate inner surface as it would appear under maximum deflection conditions similar to what is shown in FIGURE 3.

With particular reference to FIGURE 1 of the drawings, a portion of a typical ball valve construction is shown as consisting of a two piece valve body 10, having a main portion 12 including a tapped bonnet portion 14 receiving a valve spindle 16. The main body 10 is recessed axially to provide a fluid inlet 18 and an enlargement 20 constituting a valve chamber 21. The outer end of the enlargement 20 is tapped to threadably receive the minor portion of the valve body 22 which is also recessed axially to provide a fluid inlet 24. The inner ends of the fluid inlets 18 and 24 are each provided with sealing ring accommodating grooves 30 into which is adapted to fit sealing rings 32 to complete the valve seats in accordance with the invention. The terminal end 17 of the spindle 16 is shaped in rectangular form to fit loosely within a corresponding slot 33 in a ball 34. As is well known, rotation of the spindle 16 causes a corresponding rotation of the ball 34, which includes an axial recess 35, between open and closed positions relative to the fluid inlets 18 and 24 with the sealing rings 32 acting to maintain the seal between the outer spherical surface of the ball and the opposed portions of the valve body surrounding the fluid passages.

This ball valve assembly in general is well known and the invention is specifically concerned with the sealing rings 32 and their mounting within the valve chamber. As will be obvious to those skilled in the art, and with reference to the accompanying drawing, it is normally important in the manufacture of a valve of this type that close tolerances be maintained between the opposing valve seats, the sealing rings and the ball if the required sealing effect is to be achieved. For example, in the valve construction illustrated, both the depth of the sealing ring grooves and the abutting surfaces 40, 41 of the valve body portions 12 and 22 must be carefully machined to exact tolerances if the correct spacing between the opposing valve seat surfaces is to be maintained. As previously mentioned, prior art attempts have been made to overcome this problem by providing sealing rings having projections which can be deformed to suit variances in tolerance or supplementary packing rings have been utilized which are intended to be compressed to overcome any discrepancies and maintain a tight seal.

In accordance with the present invention and with reference to FIGURE 2, each sealing ring 32 is formed so as to have a general cross-section of somewhat arcuate formation or box-shaped with a concave outer surface 50 and a substantially convex inner ball-seating surface 52 as shown most clearly in FIGURES 3 and 4, for example. The outer peripheral surface 51 of the ring surrounding the central opening, form an inner supporting shoulder perpendicular to the axis of the ring, and bearing against the corresponding wall 61 of each of the grooves 30, is flat in cross-section. A further outer peripheral face or outer shoulder 54, which is flat in cross-section, is spaced axially of the ring from the inner shoulder, surrounds the exterior of the ring and bears against the wall 63 of the groove 30. In the preferred form as shown in FIGURE 2, the concave outer surface 50 is opposed to and spaced from an inclined wall 65 of the groove 30 while the convex inner surface 52 is not truly arcuate but rather comprises two inclined flat surfaces meeting an in apex 57 as shown more clearly in FIGURES 3 and 4. The slightly different form of the sealing ring 30a shown in FIGURE 5 has an inner convex surface 151 which is arcuate without any definite apex.

In operation, and assuming that the spacing between the opposed ring accommodating grooves 30 is such that a minimum deflection only of the sealing rings 32, as shown in FIGURE 3, is necessary, the outer surface of the ball 34 bears against the apex 57 of the inner surface of the ring so that it is urged inwardly along the centre as indicated by the arrow A. The deflection of the ring 32 in the direction A, due to the concave outer surface 50, places the ring under tension causing it to bear against the ring accommodating groove 30 along the direction of the arrows B and C bringing the surfaces 51, 54 more tightly against the groove surfaces 61, 63. At the same time, the convex inner surface is altered, as indicated at D, conforming to the curvature of the ball 34. As will be obvious, the preferred minimum deflection illustrated in FIGURE 3 will give the desired maximum sealing effect with the minimum of friction contact with the ball 34 making for ease in valve adjustment but it will be noted that the same maximum sealing effect is obtained with a condition of maximum deflection of the sealing ring, as shown in FIGURE 4, without seriously effecting the friction resistance by the contact of the sealing rings with the ball 34. In effect, any deflection of the sealing rings by the ball outer surface bearing on the inner surface 51 of the ring increases the circumference while placing the ring under tension giving the desired sealing effect in the directions B and C.

In other words, when the ball 34 abuts the convex surface 52 it will stretch or expand the circumference of the convex surface 52 thus placing it under tension. The spacing of the concave surface 50 from the connecting surface or inclined wall 65 of the groove 30 allows the ring to be placed under tension on bearing of the surface 52 by the ball 34.

The alternative ring shown in FIGURE 5 differs only with respect to the inner surface 151 which while being truly arcuate deflects slightly less under equal pressure conditions than the surface 51 while providing slightly more sealing contact with the ball 34. It is also contemplated that while the annular sealing rings 32 illustrated are preferably made of resilient or semi-resilient plastic material such as nylon, Teflon, or hard rubber, that similar rings having the same general formation but for example a thinner cross-section could be made of other materials, for example, metal having a sufficient degree of flexibility or resilience to permit deflection, for example stainless steel or the like.

The main requirement is that a sealing ring in accordance with the invention has the over-all concave-convex section so that when the convex surface is deflected by contact with the ball spherical surface, it is placed under tension as shown to maintain the effective seal between valve body ring seating surfaces and ball surface without permanent deformation or the need for compression (cold flow) of the material which can lead to permanent deformation as is common in the prior art sealing rings of this type.

I claim:

1. In a ball valve construction having opposed valve seats surrounding an inlet opening with sealing ring accommodating grooves having at least two transversely opposed substantially flat seating surfaces and a connecting surface, a sealing ring received in said accommodating grooves, a valve member being at least partially spherical and having rounded sealing ring contacting surfaces and adapted for rotation between said valve seats, the improvement comprising said sealing ring comprising an annular body of resilient material having (a) an exterior portion, and (b) an interior portion, the latter defining a fluid-communicating passage, said exterior portion having, in cross-section, a first substantially flat peripheral shoulder facing substantially transversely of the fluid passage and said exterior portion having a further substantially flat peripheral shoulder disposed transversely of said first peripheral shoulder in spaced relationship therewith, said shoulders being adapted to meet in sealing contact the said transversely opposed seating surfaces of said sealing ring accommodating grooves, said annular body having a substantially convex surface extending between said shoulders for engagement by said rounded sealing ring contacting surfaces of said valve member, and a substantially concave surface spaced from said connecting surface and opposed to said substantially convex surface and disposed between said shoulders whereby pressure applied to said substantially convex surface by engagement with said rounded sealing ring contacting surfaces of said valve member flexes said substantially convex surface outwardly to conform at least in part to said rounded sealing ring contacting surfaces of said valve member thereby establishing seating contact and maintaining the desired sealing contacts between said sealing ring and the corresponding seating surfaces of said sealing ring accommodating grooves.

2. In a ball valve construction according to claim 1, said substantially convex surface being essentially conical in cross-section with an apex defining the highest point as a circumferential line of demarcation encircling said convex surface.

3. In a ball valve construction according to claim 1, said substantially convex surface being essentially arcuate in cross-section thereby presenting a continuous unbroken surface.

4. In a ball valve construction according to claim 1, including a third substantially flat peripheral shoulder extending from said substantially convex surface and meeting said first substantially flat peripheral shoulder at right angles and a fourth substantially flat peripheral shoulder extending from said substantially convex surface and meeting said further substantially flat peripheral shoulder at right angles wherein the axial extent of said first substantially flat peripheral shoulder is greater than the radial extent of said third substantially flat peripheral shoulder and the radial extent of said further substantially flat peripheral shoulder is greater than the axial extent of said fourth substantially flat peripheral shoulder.

References Cited

UNITED STATES PATENTS

| | | | |
|---|---|---|---|
| 2,858,098 | 10/1958 | Sanctuary | 251—315 |
| 2,989,990 | 6/1961 | Bass et al. | 251—317 X |
| 3,050,082 | 8/1962 | Bass | 251—317 X |

M. CARY NELSON, *Primary Examiner.*

M. O. STURM, E. K. FEIN, *Assistant Examiners.*